United States Patent
Zhang et al.

(10) Patent No.: US 12,445,036 B2
(45) Date of Patent: Oct. 14, 2025

(54) ENERGY STORAGE APPARATUS AND ENERGY STORAGE APPARATUS CONTROL METHOD

(71) Applicant: Huawei Digital Power Technologies Co., Ltd., Shenzhen (CN)

(72) Inventors: Zhanjing Zhang, Xi'an (CN); Fuwen Chen, Xi'an (CN); Xinran Yang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/600,846

(22) Filed: Mar. 11, 2024

(65) Prior Publication Data

US 2024/0364206 A1    Oct. 31, 2024

(30) Foreign Application Priority Data

Apr. 26, 2023  (CN) .......................... 202310481084.4

(51) Int. Cl.
- *H02J 3/32* (2006.01)
- *H02J 7/00* (2006.01)
- *H02J 7/34* (2006.01)
- *H02M 1/00* (2006.01)
- *H02M 3/158* (2006.01)

(52) U.S. Cl.
CPC ............. *H02M 1/0058* (2021.05); *H02J 3/32* (2013.01); *H02J 7/0047* (2013.01); *H02J 7/00712* (2020.01); *H02M 1/0067* (2021.05); *H02M 3/1582* (2013.01)

(58) Field of Classification Search
CPC ............. H02M 1/0058; H02M 1/0067; H02M 3/1582; H02M 1/32; H02M 1/36; H02M 1/44; H02M 3/156; H02M 7/42; H02J 3/32; H02J 7/0047; H02J 7/00712; H02J 2207/20; H02J 7/00304; H02J 7/345; H02J 7/00; H02J 7/34
USPC ........................................................... 307/24
See application file for complete search history.

(56) References Cited

U.S. PATENT DOCUMENTS

| | | | |
|---|---|---|---|
| 2017/0207634 A1* | 7/2017 | Katano | H02H 9/001 |
| 2017/0229872 A1* | 8/2017 | Ghotra | H02J 7/35 |
| 2022/0029442 A1* | 1/2022 | Mittag | B60R 16/03 |

FOREIGN PATENT DOCUMENTS

CN      215071640 U    12/2021

\* cited by examiner

*Primary Examiner* — Rexford N Barnie
*Assistant Examiner* — Xuan Ly
(74) *Attorney, Agent, or Firm* — Maier & Maier, PLLC

(57) ABSTRACT

An energy storage apparatus includes a battery, a DC/DC conversion circuit, a controller, a first branch, and a second branch. The battery is connected to a first end of the DC/DC conversion circuit, the first branch and the second branch are connected in parallel between a first end of a power converter and a second end of the DC/DC conversion circuit, and impedance of the first branch is less than that of the second branch. A first end of a power conversion circuit is connected in parallel to a first capacitor, the controller controls, based on a difference between a voltage of the energy storage apparatus and a voltage of the power converter, the first branch and the second branch to be connected or disconnected, to implement soft-start of the energy storage apparatus or the power converter.

20 Claims, 3 Drawing Sheets

ENERGY STORAGE APPARATUS AND ENERGY STORAGE APPARATUS CONTROL METHOD

CROSS-REFERENCE TO RELATED APPLICATIONS

This application claims priority to Chinese Patent Application No. 202310481084.4, filed on Apr. 26, 2023, which is hereby incorporated by reference in its entirety.

TECHNICAL FIELD

Embodiments relate to the field of electronic circuits and to an energy storage apparatus and an energy storage apparatus control method.

BACKGROUND

Currently, an energy storage system includes an energy storage apparatus and an inverter. In an actual use process, because the energy storage apparatus and the inverter may not be powered on at the same time, a soft-start circuit needs to be disposed between the inverter and the energy storage apparatus to implement soft-start of the inverter or the energy storage apparatus. Therefore, how to improve reliability and efficiency of the soft-start circuit becomes an urgent problem to be resolved.

SUMMARY

Embodiments provide an energy storage apparatus and an energy storage apparatus control method. The energy storage apparatus includes a soft-start circuit, the soft-start circuit includes a first branch and a second branch, and the soft-start circuit implements soft-start of a power converter or the energy storage apparatus based on a difference between a voltage of the power converter and a voltage of the energy storage apparatus. This improves reliability and efficiency of the soft-start of the energy storage apparatus and the power converter.

According to a first aspect, the embodiments provide an energy storage apparatus. The energy storage apparatus includes a battery, a direct current/direct current (DC/DC) conversion circuit, a controller, a first branch, and a second branch. The battery is connected to a first end of the DC/DC conversion circuit, the first branch and the second branch that are connected in parallel between a first end of a power converter and a second end of the DC/DC conversion circuit, impedance of the first branch is less than that of the second branch, and a first end of the power converter is connected in parallel to a first capacitor; the controller is configured to: in response to that a difference between a voltage at the second end of the DC/DC conversion circuit and a voltage at the first end of the power converter is greater than or equal to a first voltage threshold, control the second branch to be connected, so that the energy storage apparatus charges the first capacitor through the second branch; and in response to that the difference between the voltage at the second end of the DC/DC conversion circuit and the voltage at the first end of the power converter is less than or equal to a second voltage threshold, control the second branch to be disconnected and the first branch to be connected, where the first voltage threshold is greater than the second voltage threshold.

In the embodiments, the first capacitor is configured to stabilize a direct current voltage input to the power converter or output by the power converter, and filter out high-frequency noise. The first end of the power converter is connected in parallel to the first capacitor, so that quality of electric energy input to the power converter can be improved, and damage to the power converter caused by an excessively large voltage or current input to the power converter can be prevented. Two branches with different impedance are disposed, so that when the energy storage apparatus is powered on first, the first capacitor connected in parallel to the power converter side is first charged through the second branch with larger impedance. In this way, a voltage at the power converter side does not suddenly change. When the voltage at the power converter side is close to a voltage of the DC/DC conversion circuit, the second branch is disconnected, the first branch with smaller impedance is connected, and the energy storage apparatus outputs electric energy to the power converter through the first branch. This reduces an electric energy loss and improves efficiency and security of the soft-start.

In a possible implementation, the first branch and the second branch form a soft-start circuit, and the soft-start circuit is connected between the power converter and the DC/DC conversion circuit in the energy storage apparatus. The first branch includes a first switch, the second branch includes a second switch, a diode, and a first resistor, and a conduction direction of the diode is from the power converter to the DC/DC conversion circuit; and the first switch is connected between the DC/DC conversion circuit and the power converter, the second switch and the diode are connected in parallel to form a parallel circuit, the parallel circuit is connected between the DC/DC conversion circuit and the power converter, and the first resistor is connected between the parallel circuit and the DC/DC conversion circuit. The controller is configured to: control the first switch to be turned on or turned off to connect or disconnect the first branch, and control the second switch to be turned on or turned off to connect or disconnect the second branch.

When the energy storage apparatus is started normally (that is, the energy storage apparatus is powered on first), and the power converter is in a to-be-started state, the second end of the DC/DC conversion circuit outputs electric energy. In this case, a difference between the voltage at the second end of the DC/DC conversion circuit and a voltage of the power converter is large (that is, greater than or equal to the first voltage threshold), and the controller controls the second switch to be turned on, so that the second branch is connected, and the energy storage apparatus outputs electric energy to the power converter through the second branch. Because the first resistor exists, the voltage at the first end of the power converter does not suddenly increase, thereby avoiding a sudden voltage change. When the electric energy output by the energy storage apparatus to the power converter through the second switch and the branch where the first resistor is located enables the voltage at the first end of the power converter close to the voltage at the second end of the DC/DC conversion circuit (that is, the difference between the voltage at the second end of the DC/DC conversion circuit and the voltage at the first end of the power converter is less than or equal to the second voltage threshold), it indicates that the soft-start succeeds. In this case, the controller controls the second switch to be turned off and the first switch to be turned on, so that the second branch is disconnected, the first branch circuit is connected, the energy storage apparatus outputs electric energy to the power converter through the first branch, and the entire system works normally. Based on this solution, when the energy storage apparatus performs soft-start on the power converter, it is ensured that the voltage at the first end of the power converter does not suddenly change, thereby ensuring safe start of the power converter.

The energy storage apparatus is connected to the power converter, and the power converter is configured to perform power conversion on the electric energy output by the energy storage apparatus and output the converted electric energy to an external load or a power grid, or perform power conversion on electric energy output by the power grid and output the converted electric energy to the energy storage apparatus. When the energy storage apparatus needs to be restarted when being faulty or when the energy storage apparatus needs to be restarted after being normally shut down, the energy storage apparatus may be restarted in a black start mode, and the energy storage apparatus may further supply power to an inverter through the soft-start circuit.

It should be understood that, in the embodiments, the difference between the voltage at the second end of the DC/DC conversion circuit and the voltage at the first end of the power converter is a difference obtained by subtracting the voltage at the first end of the power converter from the voltage at the second end of the DC/DC conversion circuit.

In a possible implementation, the second end of the DC/DC conversion circuit is connected in parallel to a second capacitor. When a difference obtained by subtracting the voltage at the second end of the DC/DC conversion circuit from the voltage at the first end of the power converter is greater than or equal to a third voltage threshold, the power converter charges the second capacitor through the second branch; and the controller is further configured to: in response to that the difference obtained by subtracting the voltage at the second end of the DC/DC conversion circuit from the voltage at the first end of the power converter is less than or equal to a fourth voltage threshold, control the first branch to be connected, where the third voltage threshold is greater than the fourth voltage threshold.

Two branches with different impedance are disposed, so that when the power converter is powered on first, the second capacitor connected in parallel to the DC/DC conversion circuit side is first charged through the second branch with larger impedance. In this way, the voltage at the DC/DC conversion circuit side does not suddenly change. When the voltage at the power converter side is close to the voltage of the DC/DC conversion circuit, the first branch with smaller impedance is connected, and the power converter outputs electric energy to the energy storage apparatus through the first branch. This reduces the electric energy loss and improves efficiency and security of the soft-start.

The soft-start circuit provided in the embodiments may further implement soft-start of the energy storage apparatus by the power converter. When the power converter is powered on first, and the energy storage apparatus is in the to-be-started state, the voltage at the first end of the power converter is greater than the voltage at the second end of the DC/DC conversion circuit (that is, the difference obtained by subtracting the voltage at the second end of the DC/DC conversion circuit from the voltage at the first end of the power converter is greater than or equal to the third voltage threshold), and the power converter outputs a voltage to charge the second capacitor through the diode and the first resistor. Because the first resistor exists, the voltage at the second end of the DC/DC conversion circuit does not suddenly increase, thereby avoiding the sudden voltage change, and ensuring safe start of the energy storage apparatus. The second capacitor connected in parallel to the second end of the DC/DC conversion circuit may smooth a direct current voltage input to the DC/DC conversion circuit, filter out high-frequency noise, and improve quality of electric energy input to the DC/DC conversion circuit. When the power converter charges the second capacitor through the second branch until the voltage at the second end of the DC/DC conversion circuit is close to the voltage at the first end of the power converter (that is, the difference obtained by subtracting the voltage at the second end of the DC/DC conversion circuit from the voltage at the first end of the power converter is less than or equal to the fourth voltage threshold), it indicates that the soft-start succeeds. In this case, the controller controls the first switch to be turned on, so that the first branch is connected, the power converter transmits electric energy to the energy storage apparatus through the first branch, and the entire system works normally. In this solution, bidirectional soft-start between the power converter and the energy storage apparatus is implemented by using the soft-start circuit. The soft-start circuit has a simple structure, and control logic is simple and efficient, thereby reducing soft-start costs and improving soft-start efficiency.

In a possible implementation, the controller is further configured to: in response to that the voltage at the first end of the power converter is continuously less than a fifth voltage threshold in a first time period, control the second branch to be disconnected, that is, to turn off the second switch.

In a case in which the energy storage apparatus is powered on first, when a short-circuit fault exists in the power converter, two connection points at the first end of the power converter are directly connected, and consequently the voltage at the first end of the power converter cannot be increased (that is, the voltage at the first end of the power converter is continuously less than the fifth voltage threshold in the first time period). In this case, to avoid the fault of the power converter affects the energy storage apparatus, the controller controls the second switch to be turned off and terminates soft-start, thereby ensuring safety of the energy storage apparatus.

In a possible implementation, the energy storage apparatus further includes a voltage detection circuit, and the voltage detection circuit is configured to detect the voltage at the second end of the DC/DC conversion circuit and the voltage at the first end of the power converter, and output a voltage detection result to the controller.

In a possible implementation, the energy storage apparatus includes the power converter, the first end of the power converter is connected to the second end of the DC/DC conversion circuit, and the power converter is configured to convert a direct current output by the DC/DC conversion circuit into an alternating current, and output the alternating current to the power grid or the external load.

In a possible implementation, the power converter is configured to convert an alternating current output by the power grid into a direct current, and output the direct current to the DC/DC conversion circuit.

In a possible implementation, the power converter is configured to perform boost or buck processing on the direct current output by the DC/DC conversion circuit, and then output the direct current to the external load; or the power converter is configured to perform boost or buck processing on a direct current output by an external power supply, and then output the direct current to the DC/DC conversion circuit.

According to a second aspect, the embodiments further provide an energy storage apparatus control method. The control method includes: obtaining a voltage at a first end of a power converter and a voltage at a second end of a DC/DC conversion circuit, where a battery is connected to a first end of the DC/DC conversion circuit, a first branch and a second branch are connected in parallel between the first end of the power converter and the second end of the DC/DC conversion circuit, and impedance of the first branch is less than that of the second branch; when a difference between the voltage at the second end of the DC/DC conversion circuit and the voltage at the first end of the power converter is greater than or equal to a first voltage threshold, controlling the second branch to be connected, so that the battery charges a first capacitor through the second branch; and when the difference between the voltage at the second end of the DC/DC conversion circuit and the voltage at the first end of the power converter is less than or equal to a second voltage threshold, controlling the second branch to be disconnected and the first branch to be connected, where the first voltage threshold is greater than the second voltage threshold.

In a possible implementation, the control method further includes: when the difference between the voltage at the first end of the power converter and the voltage at the second end of the DC/DC conversion circuit is less than or equal to a fourth voltage threshold, controlling the first branch to be connected.

In a possible implementation, the control method further includes: when the voltage at the first end of the power converter is continuously less than a fifth voltage threshold in a first time period, controlling the second branch to be disconnected.

For effects of the second aspect and the possible implementations of the second aspect, refer to the descriptions in the first aspect. Details are not described herein again.

DETAILED DESCRIPTION OF EMBODIMENTS

Figure 1:
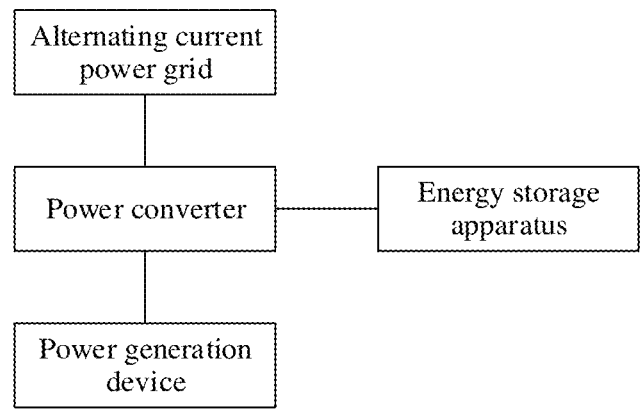
FIG. 1 is a schematic diagram of an application scenario according to an embodiment.

The following describes the solutions of the embodiments with reference to the accompanying drawings.

The following describes embodiments in detail. Examples of embodiments are shown in the accompanying drawings. In the accompanying drawings, same or similar reference numerals represent same or similar elements or elements having same or similar functions. Embodiments described below with reference to the accompanying drawings are examples, and are merely used to explain the embodiments, but cannot be understood as a limitation on the embodiments.

The terms "first", "second", "third", "fourth", and the like (if any) in are intended to distinguish between similar objects but do not necessarily indicate a specific order or sequence. It should be understood that the data termed in such a way are interchangeable in proper circumstances so that embodiments described herein can be implemented in other orders than the order illustrated or described herein.

Unless otherwise defined, a technical term or scientific data used herein should have a general meaning understood by a person of ordinary skill in the art of the embodiments.

To make the problems to be resolved, the solutions used, and the effects achieved in the embodiments clearer, the following further describes the solutions in embodiments in detail with reference to the accompanying drawings. It should be appreciated that the described embodiments are merely some, but not all, of the embodiments.

FIG. 1 is a schematic diagram of an application scenario according to an embodiment. The embodiments may be applied to a scenario in which a circuit in which bidirectional power flow is performed needs to be used. The bidirectional power flow means that a power flow direction between devices can be changed.

As shown in FIG. 1, an application scenario 100 in FIG. 1 includes a power generation device, an alternating current power grid, a power converter, and an energy storage apparatus. The power generation device may output electric energy to the alternating current power grid and the energy storage apparatus through the power converter. The alternating current power grid may receive electric energy from the power generation device and the energy storage apparatus through the power converter, and may also output electric energy to the energy storage apparatus through the power converter. The energy storage apparatus may receive electric energy from the power generation device and the alternating current power grid through the power converter, and may also output electric energy to the alternating current power grid through the power converter.

For example, the application scenario 100 may be a scenario including new energy. For example, the application scenario 100 may include photovoltaic power generation, wind power generation and a combination thereof, and another new energy scenario. This is not limited.

The power converter may include a DC/AC converter, which implements direct current/alternating current conversion and converts a direct current into an alternating current; or may include an AC/DC converter, which implements alternating current/direct current conversion and converts an alternating current into a direct current; or may include a DC/DC conversion circuit, which implements direct current/direct current conversion and performs boost or buck on the direct current.

In a possible implementation, the power converter converts a direct current from the power generation device into an alternating current and transmits the alternating current to the alternating current power grid.

In a possible implementation, the power converter converts an alternating current from the alternating current power grid into a direct current and transmits the direct current to the energy storage apparatus.

In a possible implementation, the power converter boosts or bucks the direct current from the power generation device and transfers the direct current to the energy storage apparatus, or the power converter boosts or bucks a direct current output by the energy storage apparatus and transfers the direct current to an external load.

The energy storage apparatus may be configured to perform charging or discharging. For example, if energy yield of the power generation device is higher than power consumption required by the alternating current power grid or is in a power consumption valley of the alternating current power grid, the energy storage apparatus performs charging and stores electric energy from the power generation device or the alternating current power grid; or if the energy yield of the power generation device is lower than the power consumption required by the alternating current power grid or is in a power consumption peak of the alternating current power grid, the energy storage apparatus performs discharging and releases electric energy to the alternating current power grid.

In the embodiments, the power generation device may include one or more of new energy power generation devices such as a solar photovoltaic panel and a wind turbine generator. The alternating current power grid is configured to supply power to an alternating current load. In a possible implementation, the power generation device and the energy storage apparatus may directly supply power to the load through the power converter.

In the application scenario 100, bidirectional power flow exists between the energy storage apparatus and the power converter. In other words, a path for the energy storage apparatus to output electric energy to the power converter exists, and a path for the energy storage apparatus to obtain electric energy from the power converter also exists. For example, the power converter may perform power conversion on the electric energy output by the energy storage apparatus and output the converted electric energy to an external load or a power grid, or perform power conversion on electric energy output by the power grid and output the converted electric energy to the energy storage apparatus.

Figure 2:
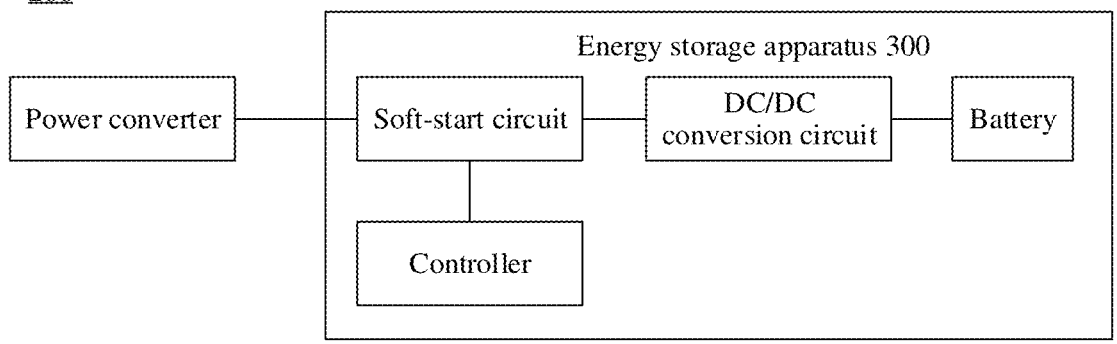
FIG. 2 is a schematic diagram of a structure of an energy storage apparatus according to an embodiment.

In an actual use process, because the energy storage apparatus and the power converter may not be powered on at the same time, there are at least the following two cases: in a first case, the power converter is powered on first, and then a main power part and an auxiliary power supply of the energy storage apparatus are powered on; in a second case, the energy storage apparatus needs to be restarted when being faulty or the energy storage apparatus needs to be restarted after being normally shut down, and the energy storage apparatus is powered on in a black start mode, that is, the energy storage apparatus is powered on first, and then the power converter is powered on. When the energy storage apparatus and the power converter are not powered on at the same time, if the energy storage apparatus is directly connected to the power converter, a circuit jitter and a large surge current may be caused due to an excessively large difference between a voltage of the energy storage apparatus and a voltage of the power converter, and the energy storage apparatus or the power converter is damaged. Therefore, to ensure safety, as shown in FIG. 2, a soft-start circuit needs to be disposed in the energy storage apparatus, and the energy storage apparatus may be connected to the power converter through the soft-start circuit. It may be understood that the power converter may be located inside the energy storage apparatus, or may be located outside the energy storage apparatus. This is not limited.

FIG. 2 is a schematic diagram of a structure of an energy storage apparatus according to an embodiment. An energy storage apparatus 200 includes a power converter, a battery, a soft-start circuit, a DC/DC conversion circuit, and a controller.

When the battery and the power converter are not powered on at the same time, the soft-start circuit may delay time between power-on time of the power converter and power-on time of the DC/DC conversion circuit in the energy storage apparatus, to ensure that the power converter is not directly connected to the DC/DC conversion circuit in the energy storage apparatus within a period of time when a jitter is caused by an excessively large difference between a voltage of the energy storage apparatus and a voltage of the power converter. After the voltages of the power converter and the DC/DC conversion circuit in the energy storage apparatus are stable and the voltage difference does not cause damage to the energy storage apparatus and the power converter, the power converter and the DC/DC conversion circuit in the energy storage apparatus are directly connected. In addition, the soft-start circuit may further control a rising slope and an amplitude of a current between the power converter and the DC/DC conversion circuit in the energy storage apparatus, to avoid generating a large surge current.

In the embodiments, the controller and the soft-start circuit are located on the energy storage apparatus, and the controller and the soft-start circuit may be powered by a power supply in the energy storage apparatus.

In the embodiments, the controller may include a voltage detection circuit. The voltage detection circuit may detect a voltage at the DC/DC conversion circuit side and a voltage at the power converter side, and output a voltage measurement result to the controller. The controller may also obtain a voltage at the energy storage apparatus side and the voltage at the power converter side from another external detection device. A manner in which the controller obtains the voltage at the DC/DC conversion circuit side and the voltage at the power converter side is not limited.

Based on the solution of the embodiments, the controller may control, based on a difference between the voltage of the DC/DC conversion circuit and the voltage of the power converter, the soft-start circuit to perform an action, to ensure that when both the DC/DC conversion circuit and the power converter are started, the difference between the voltage of the DC/DC conversion circuit and the voltage of the power converter is within a specific range, thereby ensuring security of the DC/DC conversion circuit and the power converter. The soft-start circuit implements soft-start of the power converter or the energy storage apparatus based on voltage values of the power converter and the energy storage apparatus. This improves reliability and efficiency of the soft-start.

Figure 3:
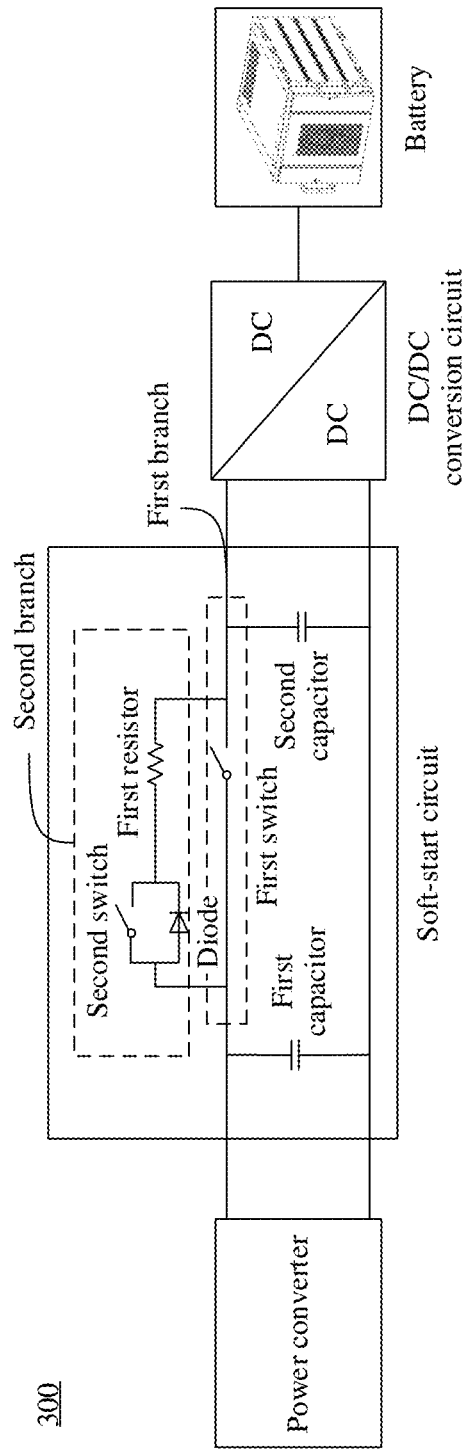
FIG. 3 is a schematic diagram of an energy storage apparatus according to an embodiment.

FIG. 3 is a schematic diagram of another energy storage apparatus according to an embodiment. A controller is not shown in the figure, but it should be understood that the energy storage apparatus includes the controller. A battery is connected to a first end of a DC/DC conversion circuit, a second end of the DC/DC conversion circuit is connected to a first end of a soft-start circuit, a second end of the soft-start circuit is connected to a first end of a power converter, and the soft-start circuit is controlled by the controller. The soft-start circuit includes a first branch and a second branch, and the first branch and the second branch are connected in parallel between the power converter and the DC/DC conversion circuit in the energy storage apparatus. The first branch includes a first switch, the second branch includes a second switch, a diode, and a first resistor, and a conduction direction of the diode is from the power converter to the DC/DC conversion circuit; and the first switch is connected between the DC/DC conversion circuit and the power converter, the second switch and the diode are connected in parallel to form a parallel circuit, the parallel circuit is connected between the DC/DC conversion circuit and the power converter, and the first resistor is connected between the parallel circuit and the DC/DC conversion circuit. The controller is configured to: control the first switch to be turned on or turned off to connect or disconnect the first branch, and control the second switch to be turned on or turned off to connect or disconnect the second branch. When the energy storage apparatus is powered on first, and the power converter is in a to-be-started state, the second end of the DC/DC conversion circuit outputs electric energy. If a difference between a voltage at the second end of the DC/DC conversion circuit and a voltage at the first end of the power converter is greater than or equal to a first voltage threshold, the controller controls the first switch to be turned off and the second switch to be turned on, that is, the first branch is disconnected, and the second branch is connected. The DC/DC conversion circuit transmits electric energy to the power converter through a first resistor and the second switch. Because the first resistor exists, a voltage at the voltage at the first end of the power converter does not suddenly increase, thereby avoiding a sudden voltage change. If the electric energy output by the energy storage apparatus to the power converter through the second switch and the first resistor enables the difference between the voltage at the second end of the DC/DC conversion circuit and the voltage at the first end of the power converter to be less than or equal to a second voltage threshold, the controller determines that the soft-start succeeds, controls the first switch to be turned on to connect the first branch, and turns off the second switch to disconnect the second branch, so that the energy storage apparatus outputs electric energy to the power converter through the first branch, and the entire system works normally. The first voltage threshold is greater than the second voltage threshold.

In the embodiments, the first voltage threshold and the second voltage threshold may be determined based on a requirement in an actual use process. Generally, a value of the second voltage threshold is small to ensure that the voltage at the first end of the power converter is close to the voltage at the second end of the DC/DC conversion circuit. For example, the first voltage threshold and the second voltage threshold are determined based on safe use voltages of the DC/DC conversion circuit and the power converter. The first voltage threshold and the second voltage threshold may be preset fixed values. For example, the first voltage threshold may be set to 0.5 V, and the second voltage threshold may be set to 0.1 V. The first voltage threshold and the second voltage threshold may also be values related to the DC/DC conversion circuit and the power converter. For example, the first voltage threshold is 5% of a difference between rated voltages of the DC/DC conversion circuit and the power converter, and the second voltage threshold is 1% of a difference between rated voltages of the DC/DC conversion circuit and the power converter. It should be understood that a manner of determining the first voltage threshold and the second voltage threshold and specific value settings are not limited.

In some examples, when the power converter is powered on first, if the difference between the voltage at the first end of the power converter and the voltage at the second end of the DC/DC conversion circuit is greater than or equal to the first voltage threshold, the power converter transmits electric energy to the DC/DC conversion circuit through the first resistor and the diode; or if the difference between the voltage at the first end of the power converter and the voltage at the second end of the DC/DC conversion circuit is less than or equal to the second voltage threshold, the first switch is controlled to be turned on. The first voltage threshold is greater than the second voltage threshold.

It should be understood that the embodiments can be for a start process of the energy storage apparatus and the power converter. When the energy storage apparatus is powered on first, it may be considered that the power converter is not powered on at this time. Similarly, when the power converter is powered on first, it may be considered that the energy storage apparatus is not powered on at this time. In addition, because the first switch and the second switch are located in the energy storage apparatus, it may be considered that when the DC/DC conversion circuit is not powered on, the first switch and the second switch are in a turn-off state.

In the embodiments, the first resistor can prevent a sudden change of a voltage at a first end of a to-be-started power converter or a voltage at a second end of a to-be-started DC/DC conversion circuit. A resistance value of the first resistor may be determined based on a requirement for a delay of the soft-start circuit in an actual use process. The delay of the soft-start circuit refers to a delay in starting the to-be-started device relative to the device powered on first. When other conditions remain unchanged, a larger resistance value of the first resistor indicates a smaller current in the circuit, a slower voltage change on the to-be-started device, and a longer delay. On the contrary, a smaller resistance value of the first resistor indicates a shorter delay. In an actual use process, to balance security and stability of the energy storage apparatus, the resistance value of the first resistor should not be excessively large or too small. A specific value and calculation of the first resistor are not limited herein.

Based on the foregoing solution, when the energy storage apparatus performs soft-start on the power converter, it is ensured that the voltage at the first end of the power converter does not suddenly change, thereby ensuring safe start of the power converter. In this solution, the controller can be configured to improve operation precision of the soft-start circuit, and improve reliability and efficiency of the soft-start circuit. In addition, when the energy storage apparatus and the power converter work normally, current circulation in the soft-start circuit in different cases can be implemented, and the first resistor is effectively used.

In addition, when the energy storage apparatus is first powered on, in the embodiments, the controller may determine action time of the soft-start circuit by controlling time at which the second switch is turned on. This improves flexibility of the soft-start circuit.

It should be understood that, in the embodiments, the difference between the voltage at the second end of the DC/DC conversion circuit and the voltage at the first end of the power converter is a difference obtained by subtracting the voltage at the first end of the power converter from the voltage at the second end of the DC/DC conversion circuit, and the difference between the voltage at the first end of the power converter and the voltage at the second end of the DC/DC conversion circuit is a difference obtained by subtracting the voltage at the second end of the DC/DC conversion circuit from the voltage at the first end of the power converter.

In the embodiments, in a possible implementation, a first capacitor may be connected in parallel to the first end of the power converter. When the difference between the voltage at the second end of the DC/DC conversion circuit and the voltage at the first end of the power converter is greater than or equal to the first voltage threshold, the controller controls the second switch to be turned on. In this case, the battery may charge the first capacitor through the first resistor and the second switch. Because the first capacitor is connected in parallel to the first end of the power converter, a voltage of the first capacitor may be used to represent the voltage at the first end of the power converter. When the battery charges the first capacitor, the voltage of the first capacitor may rise at a specific rate. Correspondingly, the voltage at the first end of the power converter may also rise at the specific rate, thereby avoiding a sudden change of the voltage at the first end of the power converter.

The rate at which the voltage rises is determined by the resistance value of the first resistor. For example, increasing the resistance value of the first resistor reduces a current between the second end of the DC/DC conversion circuit and the first end of the power converter, thereby decreasing speed at which the first capacitor is charged and the rate at which the voltage rises; and decreasing the resistance value of the first resistor increases a current between the second end of the DC/DC conversion circuit and the first end of the power converter, thereby increasing the speed at which the first capacitor is charged and the rate at which the voltage rises.

The first capacitor in the embodiments may stabilize a direct current voltage input to the power converter or output by the power converter, to filter out high-frequency noise. The first end of the power converter is connected in parallel to the first capacitor, so that quality of electric energy input to the power converter can be improved, and damage to the power converter caused by an excessively large voltage or current input to the power converter can be prevented.

In the embodiments, the second end of the DC/DC conversion circuit is connected in parallel to a second capacitor. If the difference obtained by subtracting the voltage at the second end of the DC/DC conversion circuit from the voltage at the first end of the power converter is greater than or equal to a third voltage threshold, the power converter charges the second capacitor through the diode and the first resistor; and if the difference obtained by subtracting the voltage at the second end of the DC/DC conversion circuit from the voltage at the first end of the power converter is less than or equal to a fourth voltage threshold, the controller controls the first switch to be turned on, where the third voltage threshold is greater than the fourth voltage threshold. For descriptions of the third voltage threshold and the fourth voltage threshold, refer to the foregoing descriptions of the first voltage threshold and the second voltage threshold. Details are not described herein again. For example, the third voltage threshold should be greater than or equal to a conduction voltage of the diode, and the fourth voltage threshold may be the same as or different from the second voltage threshold. This is not limited.

Because the second capacitor is connected in parallel to the second end of the DC/DC conversion circuit, a voltage of the second capacitor may be used to represent the voltage at the second end of the DC/DC conversion circuit. When the power converter charges the second capacitor, the voltage of the second capacitor may rise at a specific rate. Correspondingly, the voltage at the second end of the DC/DC conversion circuit may also rise at the specific rate, to avoid a sudden change of the voltage at the second end of the DC/DC conversion circuit. The rate at which the voltage rises is determined by the resistance value of the first resistor. For a specific determining manner, refer to related descriptions of the first capacitor. Details are not described herein. The soft-start circuit provided in the embodiments may further implement soft-start of the energy storage apparatus by the power converter. When the power converter is powered on first, and the energy storage apparatus is in the to-be-started state, the voltage at the first end of the power converter is greater than the voltage at the second end of the DC/DC converter (that is, the difference obtained by subtracting the voltage at the second end of the DC/DC conversion circuit from the voltage at the first end of the power converter is greater than or equal to the third voltage threshold), and the power converter outputs a voltage to charge the second capacitor through the diode and the branch on which the first resistor is located. Because the first resistor exists, the voltage at the second end of the DC/DC conversion circuit does not suddenly increase, thereby avoiding the sudden voltage change, and ensuring safe start of the energy storage apparatus. The second capacitor connected in parallel to the second end of the DC/DC conversion circuit may smooth a direct current voltage input to the DC/DC conversion circuit, filter out high-frequency noise, and improve quality of electric energy input to the DC/DC conversion circuit. When the power converter charges the second capacitor through the diode and the branch on which the first resistor is located until the voltage at the second end of the DC/DC conversion circuit is close to the voltage at the first end of the power converter (that is, the difference obtained by subtracting the voltage at the second end of the DC/DC conversion circuit from the voltage at the first end of the power converter is less than or equal to the fourth voltage threshold), it indicates that the soft-start succeeds. In this case, the controller controls the first switch to be turned on, the power converter transmits electric energy to the energy storage apparatus through the branch on which the first switch is located, and the entire system works normally. In this solution, bidirectional soft-start between the power converter and the energy storage apparatus is implemented by using the soft-start circuit. The soft-start circuit has a simple structure, and control logic is simple and efficient, thereby reducing soft-start costs and improving soft-start efficiency.

In the embodiments, the first switch and the second switch are components having a switch function. Specific forms of the first switch and the second switch are not limited. For example, the first switch and the second switch may be transistors, MOS transistors, or relays. If the first switch and the second switch are relays, because a resistance value of the relay is small, heat generated by a switch apparatus can be reduced, thereby avoiding increasing a heat dissipation measure, reducing an area of the soft-start circuit, and reducing costs.

Further, in a possible implementation, when the voltage at the first end of the power converter is continuously less than a fifth voltage threshold in a first time period, the controller controls the second switch to be turned off.

For example, in a case in which the energy storage apparatus is powered on first, when a short-circuit fault exists in the power converter, two connection points at the first end of the power converter are directly connected, and consequently the voltage at the first end of the power converter cannot be increased (that is, the voltage at the first end of the power converter is continuously less than the fifth voltage threshold in the first time period). In this case, to avoid the fault of the power converter affects the energy storage apparatus, the controller controls the second switch to be turned off and terminates soft-start, thereby ensuring safety of the energy storage apparatus. The fifth voltage threshold may be determined based on an actual working status. A manner of determining the fifth voltage threshold and a specific value are not limited. For example, the fifth voltage threshold may be equal to a short-circuit voltage of the power converter.

The foregoing solution can ensure use of the first resistor during normal operation, and can also prevent the first resistor from being damaged. This improves reliability and a service life of the soft-start circuit.

Figure 4:
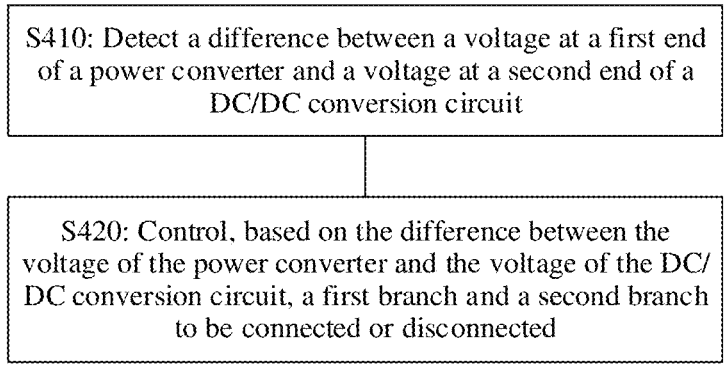
FIG. 4 is a schematic diagram of an energy storage apparatus control method according to an embodiment.

FIG. 4 is a schematic diagram of an energy storage apparatus control method according to an embodiment. An execution body in FIG. 4 may be a controller of a soft-start circuit, and the controller may be located in an energy storage apparatus.

As shown in FIG. 4, the control method includes the following steps.

S410: Obtain a voltage at a first end of a power converter and a voltage at a second end of a DC/DC conversion circuit, where the DC/DC conversion circuit is located in the energy storage apparatus.

For example, the voltage of the power converter and the voltage of the energy storage apparatus may be obtained from a voltage detection circuit or a detection apparatus.

In a possible implementation, the voltage detection circuit or the detection apparatus is located in the controller.

In a possible implementation, the voltage detection circuit or the detection apparatus is not in the controller, but may establish communication with the controller.

S420: Control, based on a difference between the voltage of the power converter and the voltage of the DC/DC conversion circuit, a first branch and a second branch to be connected or disconnected.

For example, when the difference between the voltage at the second end of the DC/DC conversion circuit and the voltage at the first end of the power converter is greater than or equal to a first voltage threshold, the second branch is controlled to be connected, so that a battery charges a first capacitor through the second branch; and when the difference between the voltage at the second end of the DC/DC conversion circuit and the voltage at the first end of the power converter is less than or equal to a second voltage threshold, the second branch is controlled to be disconnected and the first branch is controlled to be connected, where the first voltage threshold is greater than the second voltage threshold. For specific control content, refer to descriptions of actions of the soft-start circuit in FIG. 3. Details are not described herein again.

In some examples, the control method further includes: when the difference between the voltage at the first end of the power converter and the voltage at the second end of the DC/DC conversion circuit is less than or equal to a fourth voltage threshold, controlling the first branch to be connected.

In some examples, the control method further includes: when the voltage at the first end of the power converter is continuously less than a fifth voltage threshold in a first time period, controlling the second branch to be disconnected. In the embodiments, when the power converter and the DC/DC conversion circuit are not started at the same time, or when the power converter and the DC/DC conversion circuit are just started, the difference between the voltage of the power converter and the voltage of the DC/DC conversion circuit is large.

It should be noted that, in the embodiments, components connected in series on a same branch may exchange locations with each other, and implementation of a function of a drive circuit is not affected. For ease of description, the embodiments do not show all distribution cases. However, it should be understood that a case in which components connected in series on a same branch exchange a location with each other should also fall within the scope of the embodiments.

It should be understood that the term "and/or" describes only an association relationship between associated objects and represents that three relationships may exist. For example, A and/or B may represent the following three cases: only A exists, both A and B exist, and only B exists.

In addition, the character "/" generally indicates an "or" relationship between the associated objects.

A person of ordinary skill in the art may be aware that, in combination with the examples described in embodiments, apparatuses may be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

In the several embodiments provided, it should be understood that the systems and apparatuses may be implemented in other manners. For example, the described apparatus embodiment is merely an example. For example, the apparatus division is merely logical function division and may be other division in actual implementation. For example, a plurality of apparatuses or components may be combined or integrated into another system, or some features may be ignored or not performed. In addition, the displayed or discussed mutual couplings or direct couplings or communication connections may be implemented through some interfaces, indirect couplings or communication connections between the apparatuses, or electrical connections, mechanical connections, or connections in other forms.

The foregoing descriptions are merely specific implementations of the embodiments, but are not intended as limiting. Any variation or replacement readily figured out by a person skilled in the art within the scope of the embodiments shall fall within their scope.

The invention claimed is:

1. An energy storage apparatus, comprising:
    a battery, a direct current/direct current (DC/DC) conversion circuit, a controller, a first branch, and a second branch,
    the battery is connected to a first end of the DC/DC conversion circuit, the first branch and the second branch are connected directly in parallel between a first end of a power converter and a second end of the DC/DC conversion circuit, impedance of the first branch is less than that of the second branch, and the power converter is connected in parallel to a first capacitor;
    wherein the first branch comprises a first switch, the second branch comprises a second switch, a diode, and a first resistor, and a conduction direction of the diode is from the power converter to the DC/DC conversion circuit; and
    the controller is configured to:
    when a difference between a voltage at the second end of the DC/DC conversion circuit and a voltage at the first end of the power converter is greater than or equal to a first voltage threshold, control the second branch to be connected, so that the energy storage apparatus charges the first capacitor through the second branch; and
    when the difference between the voltage at the second end of the DC/DC conversion circuit and the voltage at the first end of the power converter is less than or equal to a second voltage threshold, control the second branch to be disconnected and the first branch to be connected, wherein the first voltage threshold is greater than the second voltage threshold.

2. The energy storage apparatus according to claim 1, wherein the second end of the DC/DC conversion circuit is connected in parallel to a second capacitor, and, when the difference between the voltage at the first end of the power converter and the voltage at the second end of the DC/DC conversion circuit is greater than or equal to a third voltage threshold, the power converter charges the second capacitor through the second branch; and the controller is further configured to: when the difference between the voltage at the first end of the power converter and the voltage at the second end of the DC/DC conversion circuit is less than or equal to a fourth voltage threshold, control the first branch to be connected, wherein the third voltage threshold is greater than the fourth voltage threshold.

3. The energy storage apparatus according to claim 1, wherein the first switch is connected between the DC/DC conversion circuit and the power converter, the second switch and the diode are connected in parallel to form a parallel circuit, the parallel circuit is connected between the DC/DC conversion circuit and the power converter, and the first resistor is connected between the parallel circuit and the DC/DC conversion circuit; and the controller is configured to: control the first switch to be turned on or turned off to connect or disconnect the first branch, and control the second switch to be turned on or turned off to connect or disconnect the second branch.

4. The energy storage apparatus according to claim 2, wherein the first branch comprises a first switch, the second branch comprises a second switch, a diode, and a first resistor, and a conduction direction of the diode is from the power converter to the DC/DC conversion circuit; the first switch is connected between the DC/DC conversion circuit and the power converter, the second switch and the diode are connected in parallel to form a parallel circuit, the parallel circuit is connected between the DC/DC conversion circuit and the power converter, and the first resistor is connected between the parallel circuit and the DC/DC conversion circuit; and the controller is configured to: control the first switch to be turned on or turned off to connect or disconnect the first branch, and control the second switch to be turned on or turned off to connect or disconnect the second branch.

5. The energy storage apparatus according to claim 1, wherein the controller is further configured to: when the voltage at the first end of the power converter is continuously less than a fifth voltage threshold in a first time period, control the second branch to be disconnected.

6. The energy storage apparatus according to claim 3, wherein the controller is further configured to: when the voltage at the first end of the power converter is continuously less than a fifth voltage threshold in a first time period, control the second branch to be disconnected.

7. The energy storage apparatus according to claim 4, wherein the controller is further configured to: when the voltage at the first end of the power converter is continuously less than a fifth voltage threshold in a first time period, control the second branch to be disconnected.

8. The energy storage apparatus according to claim 1, wherein the energy storage apparatus further comprises a voltage detection circuit, and the voltage detection circuit is configured to detect the voltage at the second end of the DC/DC conversion circuit and the voltage at the first end of the power converter, and output a voltage detection result to the controller.

9. The energy storage apparatus according to claim 2, wherein the energy storage apparatus further comprises a voltage detection circuit, and the voltage detection circuit is configured to detect the voltage at the second end of the DC/DC conversion circuit and the voltage at the first end of the power converter, and output a voltage detection result to the controller.

10. The energy storage apparatus according to claim 3, wherein the energy storage apparatus further comprises a voltage detection circuit, and the voltage detection circuit is configured to detect the voltage at the second end of the DC/DC conversion circuit and the voltage at the first end of the power converter, and output a voltage detection result to the controller.

11. The energy storage apparatus according to claim 1, wherein after the controller controls the second branch to be disconnected and the first branch to be connected, the energy storage apparatus transmits electric energy to the power converter through the first branch.

12. The energy storage apparatus according to claim 3, wherein after the controller controls the second branch to be disconnected and the first branch to be connected, the energy storage apparatus transmits electric energy to the power converter through the first branch.

13. The energy storage apparatus according to claim 2, wherein after the controller controls the first branch to be connected, the power converter transmits electric energy to the energy storage apparatus through the first branch.

14. The energy storage apparatus according to claim 1, wherein the energy storage apparatus comprises the power converter, the first end of the power converter is connected to the second end of the DC/DC conversion circuit, and the power converter is configured to convert a direct current output by the DC/DC conversion circuit into an alternating current, and output the alternating current to a power grid or an external load.

15. The energy storage apparatus according to claim 14, wherein the power converter is configured to convert an alternating current output by the power grid into a direct current, and output the direct current to the DC/DC conversion circuit.

16. The energy storage apparatus according to claim 14, wherein the power converter is configured to perform boost or buck processing on the direct current output by the DC/DC conversion circuit, and then output the direct current to the external load; or the power converter is configured to perform boost or buck processing on a direct current output by an external power supply, and then output the direct current to the DC/DC conversion circuit.

17. A method, comprising:
obtaining a voltage at a first end of a power converter and a voltage at a second end of a DC/DC conversion circuit, wherein a battery is connected to a first end of the DC/DC conversion circuit, a first branch and a second branch are connected directly in parallel between the first end of the power converter and the second end of the DC/DC conversion circuit, and impedance of the first branch is less than that of the second branch;

wherein the first branch comprises a first switch, the second branch comprises a second switch, a diode, and a first resistor, and a conduction direction of the diode is from the power converter to the DC/DC conversion circuit;

when a difference between the voltage at the second end of the DC/DC conversion circuit and the voltage at the first end of the power converter is greater than or equal to a first voltage threshold, controlling the second branch to be connected, so that the battery charges a first capacitor through the second branch; and when the difference between the voltage at the second end of the DC/DC conversion circuit and the voltage at the first end of the power converter is less than or equal to a second voltage threshold, controlling the second branch to be disconnected and the first branch to be connected, wherein the first voltage threshold is greater than the second voltage threshold.

18. The method according to claim 17, further comprising:

when the difference between the voltage at the first end of the power converter and the voltage at the second end of the DC/DC conversion circuit is less than or equal to a fourth voltage threshold, controlling the first branch to be connected.

19. The method according to claim 17, further comprising:

when the voltage at the first end of the power converter is continuously less than a fifth voltage threshold in a first time period, controlling the second branch to be disconnected.

20. The method according to claim 18, further comprising:

when the voltage at the first end of the power converter is continuously less than a fifth voltage threshold in a first time period, controlling the second branch to be disconnected.

* * * * *